May 23, 1950     W. A. AYRES     2,508,358
RADIO OBJECT POSITION INDICATOR USING
COLORS FOR DISTANCE INDICATION Filed Dec. 7, 1942     2 Sheets—Sheet 1

INVENTOR
W. A. AYRES
BY *Paul B. Hunter*
ATTORNEY

May 23, 1950 — W. A. AYRES — 2,508,358
RADIO OBJECT POSITION INDICATOR USING
COLORS FOR DISTANCE INDICATION
Filed Dec. 7, 1942 — 2 Sheets-Sheet 2

INVENTOR
W. A. AYRES
BY
Paul B. Hunter
ATTORNEY

Patented May 23, 1950

2,508,358

UNITED STATES PATENT OFFICE 2,508,358

RADIO OBJECT POSITION INDICATOR USING COLORS FOR DISTANCE INDICATION

Waldemar A. Ayres, Kew Gardens Hills, N. Y., assignor to The Sperry Corporation, a corporation of Delaware Application December 7, 1942, Serial No. 468,298

25 Claims. (Cl. 343—11)

This invention relates to the art of object scanning, and more particularly to methods of and apparatus for surveying objects and forming colored or other peculiarly characterized representations of the component portions of the objects to represent some function of the portions, preferably independent of their natural color. Thus, the portions may be identified as a function of distance from or velocity relative to a reference point, for example, the observer or surveying mechanism.

The invention has specific application in the fields of object detection and range finding, to which uses typical embodiments of the invention herein have been shown applied. It is customary to project a beam of radiant energy, such as collimated ultra high frequency electromagnetic waves, preferably having a wavelength in the range from 1 cm. to 100 cm., against successive portions of an object to be scanned, and to form images of the irradiated portions oscillographically by synchronizing the movements of the radiant energy beam and the oscillograph ray or stream, thereby to form an oscillograph image depicting the general shape and location of all irradiated objects capable of reflecting radiation to the region of the source. In some instances, the reproducing mechanism may be made responsive only to radiant energy waves having a frequency different from the radiating source. Such mechanism is useful in forming images of objects moving toward or from the source, since the object motion affects the frequency of the reflected waves in accordance with the well known Doppler effect. In any event, it frequently is desirable for the observer to know the range, velocity, or other characteristic of the irradiated object, without the need for additional cumbersome equipment, and without requiring the observer to divert his attention from the screen on which the image is produced.

The present method and apparatus satisfy this need by differentiating between the transmitted and received energy waves and characterizing the appearance of the resulting image as a function of the determined differential. Whether the differential relates to the frequency difference, the travel time interval, or other distinguishing factor between the transmitted and received energy waves, the respective images correspondingly are characterized as by coloring, toning, controlling the brightness, or otherwise modulating the appearance of the image.

Although the invention herein is disclosed as a system for forming colored-appearing images as a function of range, or separating distance, merely for illustrative purposes, it will become apparent that the principles of the invention are equally applicable to other arrangements. Because of the wide range of patentably equivalent arrangements that may be devised, the present disclosure omits any specific details of construction considered unnecessary to a complete understanding of the principles of the invention.

The principal objects of the present invention are: to provide an improved object-detecting system; to provide a system for forming pictorial reproductions of remote objects and for modifying the appearance of the reproductions in accordance with the range of the objects; to provide a system of irradiating an object, and characterizing representations of the object as a function of a differential between the transmitted energy and the energy reflected from the object; to provide a system of representing distant objects by different colors, tones, or textures, signifying the range of the respective objects; to provide an object-irradiating system adapted to project radiant waves recurrently against successive portions of a remote object, and to form representations of such portions in colors characterizing the time required for the waves to travel to and from the object; and to provide in such systems means for forming colored-appearing images with a primary system of colors to represent objects lying in zones at different distances from the surveying mechanism, with means for blending such colors to represent objects lying in regions intermediate such zones. These and other objects to the present invention will become apparent from the following description and from the accompanying drawings.

Generally speaking, the invention comprehends irradiating a distant object and forming a reproduction of such object in color or other characterizing media to signify the range. Throughout the present description, range denotes the actual distance between the object to be surveyed and the surveying mechanism and not merely the horizontal component of such distance. Although the apparatus is susceptible of many modifications, the apparatus comprises generally an energy radiator R adapted to project collimated electromagnetic waves against successive portions of an object to be surveyed. The range, preferably measured as time required for energy to travel to the object and return to the reproducing means M, may be determined by a range computer C, and the received signals are segregated according to range by a range commutator K. Image characterizing means I, preferably comprising a color disc, are disposed in cooperative relation to a screen S on which the image is formed so as in some way to identify the images as a function of the time differential, frequency differential, or other differential between the transmitted and received energy. A color commutator L renders the reproducing means inoperable except when the reflected energy signifies a range properly characterized by the concurrently cooperative portion of the color disc.

Figures 1, 2:
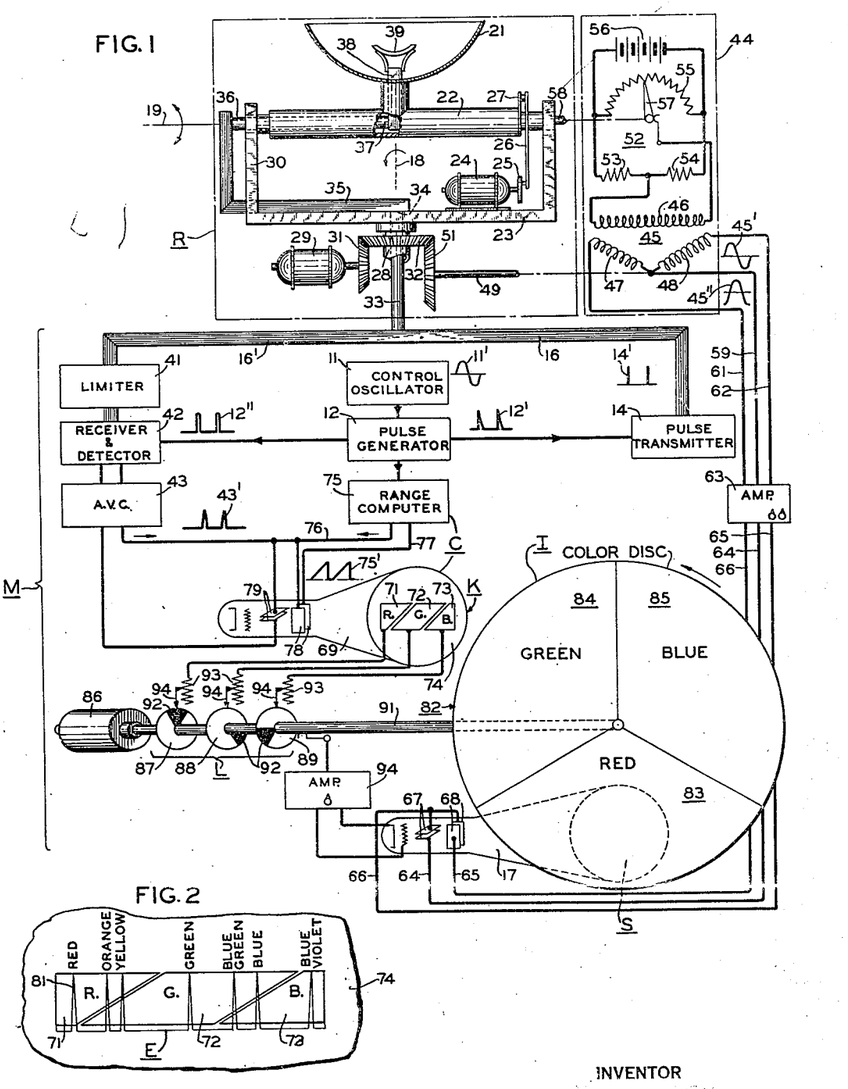
Fig. 1 is a schematic diagram of one system embodying principles of the present invention.
Fig. 2 is an enlarged detail view of the range commutator tube.

Referring now in greater detail to Fig. 1, the present invention is disclosed in connection with a reflected wave or reflected pulse type of ultra high frequency radio system specifically adapted to produce a chromatic indication of range. In the system illustrated, a control oscillator 11 of any well known type provides a voltage having a frequency preferably in the audio range, suitable for frequency control purposes. The output wave from the oscillator 11 is shown diagrammatically at 11' and may be used directly to sinusoidally modulate the carrier wave of a transmitter 14, but preferably the oscillator 11 is connected to a pulse generator 12 which converts the substantially sinusoidal oscillations fed to it into pulses of any desired shape, magnitude, and duration, having a repetition rate equal to the frequency of the oscillator 11. The pulse generator 12 may employ well known clipping and other suitable wave-shaping circuits in the conventional manner, to form square or trigger pulses 12'.

Trigger pulses 12' are supplied to the transmitter 14, causing an ultra high frequency oscillator such as a magnetron, to be biased on momentarily. Transmitter 14 thus is caused to produce extremely short pulses 14' having a duration perhaps of one microsecond. The carrier frequency waves or pulses are fed through a rectangular wave guide 16 to the radiator R. The type of radiated energy employed depends largely upon the use to which the apparatus is put. For use in connection with object detection, it is customary to use extremely short radio frequency pulses, whereas when the apparatus is employed to detect objects moving toward or from the radiant energy source, it may be desirable to use a continuous wave unmodulated carrier, and to discriminate between the incident and reflected energy in terms of frequency differential created by the moving object according to the Doppler principle.

The radiator R comprises an energy collimator and scanning means adapted to sweep a beam of radiant energy against successive portions of a remote object. The radiator R also may be useful in picking up the reflected energy and conducting such energy to the reproducing means. The radiator R is adapted to scan a predetermined conical angle up to and including a complete hemisphere preferably by means of a spiral conical motion. This motion may be provided by rapidly spinning the radiating system about a central axis 18 while slowly nodding the system about a transverse axis 19, preferably perpendicular to and rotatable with the central axis. Thus, it will be noted the radiator R is rotatable in azimuth and elevation for scanning successive portions of space.

Although any type of radiator R may be used to produce electronic or mechanical scanning, a simple form of apparatus may comprise a spherical or parabolic reflector 21 attached to a supporting member 22 which is pivotally mounted between the arms 30 of a yoke 23. A motor 24, mounted on the yoke 23 carries a crank 25 on its drive shaft, with a connecting rod 26 extending from the crank to a lever arm 27 extending generally radially from the member 22. The motor 24 preferably rotates at a relatively low speed so as to produce a nod at a corresponding rate about the axis 19 of the reflector 21. A stationary motor 29 rotates the yoke 23 about the central axis 18 by means of a bevel drive pinion 31 and a bevel gear 32 mounted on a hollow column 28, journaled about the central axis 18.

The rectangular wave guide 16 is connected to a cylindrical wave guide 33 which enters the radiator R by passing concentrically through the hollow column 28. A rotatable joint 34 connects the cylindrical guide 33 to another rectangular wave guide 35 fastened to the yoke 23. The guide 35 projects through an arm 30 of the yoke and extends upwardly toward the nod axis 19. A second rotatable joint 36 connects the wave guide 35 to a second cylindrical wave guide 37 supported concentrically within the member 22. A final section of rectangular wave guide 38, attached to the end of the guide 37 lies on the central axis 18 and is adapted to conduct electromagnetic energy to and from a deflecting plate 39 within the reflector 21. Suitable low loss rotatable wave joints and means for bilaterally converting electromagnetic wave propagation in rectangular wave guides to propagation in cylindrical guides may be used as desired. So also a suitable impedance matching system may be used between the wave guide 38 and the deflecting plate 39 to provide maximum transfer of energy.

The transmitted pulses 14' are emitted in a highly directive pattern from the radiator R at a pulsing frequency sufficiently high to insure that all objects within the field of view are irradiated during the scanning cycle, the period between waves being long enough to permit the radiant energy to travel to the most remote point of the scanned object or field, and to return to the region of the transmitter.

The wave guide 16 continues on past the point of intersection with the guide 33 to form a guide 16' providing a return path for the reflected energy to a receiver and detector 42 of the reproducing means M. A limiter 41 is interposed in the guide 16' so as to protect the receiver from strong pulses conveyed directly from the transmitter 14. The limiter 41 is of well known construction and comprises a device having relatively high impedance to strong signals and relatively low impedance to weak signals.

One well known type of limiter 41 comprises a gas-filled resonant chamber containing electrodes, which chamber is maintained close to the ionization point. The electrodes flash over and discharge the device when strongly excited, thus effectively damping the exciting oscillations. The electrical length of the wave guide 16' is selected to reflect a very high impedance at the point of connection with the wave guide 33 when directly transmitted pulses discharge the limiter.

The receiver and detector 42 amplifies and detects the received pulses in the usual manner and conducts the received signals to an automatic volume control 43, which produces output signals of constant magnitude, substantially independent of input signal strength. To further insure against pulses being conducted directly from the transmitter 14 to the reproducing means M, blanking pulses 12" may be furnished from the pulse generator 12 to bias the receiver 42 to an insensitive condition for the duration of the transmitted pulses. The pulses 43' leaving the automatic volume control 43 are delayed behind their respective transmitted pulses by the time required for the radiant energy to travel to the object and to return.

A sweep circuit mechanism 44 mechanically connected to the radiator R is adapted to convert the spiral scanning motion of the radiator into corresponding cathode or light ray deflecting potentials for an oscilloscope 17. The sweep circuit mechanism 44 comprises a two-phase generator 45 having a field winding 46 and rotor windings 47 and 48 spaced electrically 90° with respect to one another. The rotor windings are driven synchronously with the spin motion of the radiator R by means of a rotor shaft 49 having a bevel gear 51 attached thereto identical with and in operative engagement with the bevel gear 32 on the column 28. The field winding 46 is energized by the variable output of a bridge circuit 52 which circuit is formed by series-connected equal fixed resistors 53 and 54 shunted across the terminals of a potentiometer 55. The bridge circuit 52 is supplied with direct voltage from a source such as a battery 56 applied across the bridge, while winding 46 is connected between the junction of the resistors 53, 54, and a sliding contact arm 57 for the potentiometer 55.

The contact arm 57 is oscillated synchronously with the nodding motion of the radiator R by means of a connecting shaft 58 extending from the member 22 along the nod axis 19. The output of the bridge 52 varies from zero, when the principal axis of the reflector 21 is parallel to or coincides with the spin axis 18, to predetermined positive and negative values corresponding to the maximum nod angles in opposite directions. A lead 59 extends to an amplifier 63 from the common junction of windings 47 and 48 while leads 61 and 62 similarly extend from the respective opposite ends of windings 47 and 48.

The sinusoidal voltages 45' and 45" produced by the windings 47 and 48, have a frequency equal to the rate of spin, with amplitude varying sinusoidally at the nodding frequency. The voltages 45', 45" are in phase quadrature, as shown, as a result of the 90° electrical displacement between the windings 47, 48. Each of the voltages 45', 45" may be amplified as desired by means of a suitable amplifier 63, and the output voltages are fed through wires 64, 65 and 66 to the respective horizontal and vertical deflecting plates 67 and 68 as shown. Accordingly, the amplified voltages 45', 45" in phase quadrature and varying periodically from zero to maximum voltage provide a circular sweep for the oscilloscope 17 of constantly changing amplitude since the nod rate is a small fraction of the spin rate. Since the sweep circuit mechanism 44 is synchronized with the radiator R, the oscilloscope stream or cathode ray is swept in a spiral path synchronized with the motion of the radiant energy beam from the parabolic reflector 21.

The device thus far described is well known and is in common use for forming on the screen S an image of the object being scanned, it being customary to key the tube 17 with the pulses 43'. The principal drawback to the system thus far described is that it fails to provide the operator with any indication of the proximity of the scanned object. In commercial aircraft use, the range of an object lying in the path of flight must be determined to properly enable the pilot to navigate his craft so as to avoid collision with the object. When the apparatus is put to military use, as for tracking targets, the range is necessary in aiming a projectile to be fired at the target. With the present invention, an indication of such parameters as range or target velocity may be provided by differentiating between the transmitted or incident wave, and the received or reflected wave. Although such differentiation may make use of the Doppler principle in determining target velocity relative to the point of observation, for the purpose of illustrating the invention the present system is described as one utilizing a range computer and a range signal commutator adapted to distinguish the time interval between the incident and the reflected waves, and accordingly the travel time for the radiant energy while proceeding to and from the scanned object.

The range commutator K may be of any desired form capable of segregating the reflected waves according to their travel time, and therefore according to the range of the respective portions of the object from which the waves are reflected. One form of such a commutator K which is useful for this purpose comprises a cathode ray tube 69 having a plurality of spaced electrodes 71, 72, and 73 on the target area or screen 74. A sawtooth signal generator 75 is adapted to produce sawtooth waves 75' at a frequency controlled by the pulse generator 12. The tube 69 operates continuously and the cathode ray is initially located off-center so as to be swept alongside of, for example, below, the electrodes 71, 72 and 73 during each cycle between transmitted pulses, forming a trace E in Fig. 2. This effect is produced by connecting the output leads 76 and 77 from the signal generator 75 to the plates 78 producing horizontal sweep in the tube 69. Since the cathode ray thereby does not impinge upon the electrodes 71, 72, 73 during the sweeping operation, no current flows through the electrodes. However, by providing vertical deflection of the cathode ray at each instant that signals 43' are received, the cathode ray may be deflected on to the electrodes to cause a momentary flow of current. This result is obtained by connecting the output of the automatic volume control 43 to the plates 79 causing vertical deflection of the electron stream in the tube 69.

In Fig. 2, the electron trace E is shown extending along the electrodes 71, 72, 73, and is shown affected by seven reflected pulses received at successive periods of time following the transmission of an incident wave. At the start of each cycle immediately following the transmission of a pulse the electron stream is deflected to a datum point at the left side of the screen and thereupon progressively sweeps toward the right-hand side during the remainder of the cycle. The reception of any signals during this period causes the trace E to be deflected vertically onto the respective electrodes, forming peaks, such as peak 81 in the manner shown. Ordinarily since the target or objects in the field of view would be at different angular positions, the various peaks such as 81, 81', 82'', etc., for example, would be provided on different sweeps of the trace E. The plurality of targets in line with respect to the radiator R, would produce a corresponding plurality of peaks during a single sweep of the trace E provided an advanced target did not completely prevent radiant energy from reaching a more remote target. Current flows through the respective electrodes in amplitude according to the length of time that the electron stream impinges on the respective electrodes. Thus, there is represented by the various peaks of Fig. 2 a plurality of objects positioned at differing distances from the radiator R and within the solid angle swept by the beam of electromagnetic energy during its scanning cycle. Since the beam of electromagnetic energy has a finite width, portions of its energy may be intercepted and reflected from any objects positioned at different distances from the radiator R. Since the electrodes 71, 72, 73 are spaced from one another along a path representing the range or travel time of the reflected pulses, it is apparent that the flow of current to the respective electrodes may be used for controlling an image characterizing means, cooperable with the oscilloscope 17 to characterize the images, for example, as a function of range.

Thus, currents will flow through respective electrodes 71, 72, 73 in synchronism with the commutator L to activate the electron beam of tube 17 when the appropriately colored portion 83, 84 or 85 of the disc I is over the screen S. Thus, the target indications for the plurality of peaks of Fig. 2 will be differently colored in accordance with the different ranges of the objects. The appearance of the indications on the screen S will be spots positioned in azimuth and elevation in accordance with the location of each such object and having a color in accordance with the range of such object.

Ordinarily during scanning operations the beam emanating from radiator R will encounter but a single target, which will give rise to a single vertical deflection of the trace E at a time in the sweep corresponding to the range of the target. Thus, for instance, a single peak, such as peak 81, would be present in the structure Fig. 2, with the other peaks absent. Under such circumstances, tube 17 will be activated by the current flowing in electrode 71 at a time when the appropriate colored sector 83 passes over the screen S, which color characterizes the target indication and serves to indicate the approximate distance of the target from radiator R.

The number of received reflected pulses from a detected object varies as a function of the scanning rate, the scanning beam angle and the pulse repetition rate. By suitable selection of these factors, an object disposed relatively close to the radiator R, such as that depicted by peak 81, will give rise to a plurality of reflected pulses so that for successive sweeps of the trace E plural vertical deflections will occur at the same position on the electrode 71. By appropriate selection of the rotational speed of the color disc I in relation to the number of reflected pulses per target, an indication of an object is made to appear on the screen S at angular position corresponding to the location of the target. Since the electrodes 71, 72, 73 are spaced from one another along a path representing the range or travel time of the reflected pulses, it is apparent that the flow of current to the respective electrodes may be used for controlling an image characterizing means, cooperable with the oscilloscope 17 to characterize the images, for example, as a function of range.

The signals from the electrodes 71, 72, 73 may be used directly for modulating the tube 17 in any suitable manner capable of distinguishing the images according to the ranges which they designate. Each signal from the electrodes might be used to control the signal intensity, that is, by having the signals imposed directly on the control grid of the tube 17, as will more fully appear, whereby either brighter or dimmer images are formed from stronger signals resulting from shorter ranges, or in any other way that images formed by radiant energy having short travelling time have a different appearance from those having a longer travel time.

Preferably, however, the image characterizing means makes use of separate colors in any way capable of separately coloring the images as a function of range. One practical embodiment as disclosed in Fig. 1 utilizes color or toning media of one or more colors or monochromatic tones intermittently cooperable with the respective images for coloring or shading the images as a function of the time required for the radiant energy to travel to and from the scanned objects. Because of physical limitations, it has been found advisable to dispose each color medium in cooperative relation with the images for a plurality of successive cycles and to control the signals from the range commutator K so that the reproducing means are rendered inoperative to form any images except those which are properly characterized by the concurrently cooperative colored medium. Accordingly, delineations of objects or portions of objects disposed in space are made to appear on the screen S of the reproducing means, such as the cathode ray tube 17, successive portions of the screen S being adapted to be excited by an electron stream. Through the action of color media, these delineations are rendered colored in appearance.

As shown in Fig. 1 the color medium may comprise separately colored transparent filters intermittently movable into cooperative relation with the screen S. The coloring means may comprise a color disc 82 divided into equal sectors, preferably occupied by thin transparent filters 83, 84 and 85, preferably adapted to pass the primary colors red, green and blue, respectively, although other colors may be used as well. The colors ascribed to the respective ranges may be chosen arbitrarily but in the embodiment herein disclosed, the images representing close objects logically have been designated red because of the more natural response of the observer to this color, rendering it a logical color to use for denoting close objects. Likewise intermediate and distant objects may be characterized by green and blue, respectively, because they are appropriate to this purpose, although it will be understood that any arrangement of colors may be used.

With the color disc in the position shown in Fig. 1, the red filter 83 is disposed in front of the screen S so that all images formed on the screen S appear red. It is obvious that since the red filter occupies this position for a relatively large number of cycles, only those images designating objects at close range meanwhile should be formed. Control means, such as the color commutator L is provided for this purpose and activates the electron stream of the tube 17 only during intervals designating the desired ranges while inhibiting the formation of all other images which otherwise would be formed during the remainder of the successive cycles. As shown in Fig. 1, the color commutating means L comprises a switch mechanism driven by a low speed motor 86. The switch mechanism is diagrammatically shown as a plurality of insulating drums 87, 88 and 89 mounted on shaft 91 of the motor 86. The color disc 82 likewise is fixed on the shaft 91 so that its motion is synchronized with the rotation of the color commutator L. Each of the drums 87, 88, 89 is provided with a conductive segment 92 connected with the respective electrodes 71, 72, 73 through a contactor 94 and filter-compensating resistor 93. The respective segments are disposed relative to one another in such a position that the circuit may be completed through contactors 94 whenever the corresponding color filters completely cover the screen S. The arc subtended by each segmental sector 92 is smaller than the arc subtended by the color filters so that the commutator L is non-conductive whenever the color filters extend only part-way across the face of the screen S. The resistors 93 are adjusted to compensate for the different transmission factors for the respective filters 83, 84, 85, it being known that red filters ordinarily transmit appreciably more light than green filters and many times more light than blue filters. The signals passing from the electrodes 71, 72, 73 through conductive segments 92 are conducted to an amplifier 94' where the signals are amplified a suitable degree to key the tube 17. As pointed out previously, the respective objects may be characterized in terms of brightness of the image. Thus, the color disc may be omitted and the respective resistors 93 adjusted to provide graduated intensity of the signals applied to the control element of tube 17, according to which of the electrodes 71, 72, 73 the signals proceed from. More efficient results then may be obtained by making drums 87, 88, 89 conductive about their entire periphery.

It will be noticed that the electrodes 71, 72, 73 have parallel sloping adjoining sides so that vertical deflection of the trace E may cause the stream to impinge on two adjoining electrodes. Accordingly, the peaks 81 are adapted to form colored representations for each of the electrodes impinged upon, and since color disc 82 normally rotates at least a small number of times per second, the combined colors formed by the respective filters are blended in the eyes of the observer to form the secondary colors.

As an example of operation, it will be assumed that successive radio frequency pulses are projected as a beam by the radiator R so as to irradiate successive portions of distant objects, and that during each cycle between successive transmitted pulses reflected energy will produce peaks 81 spaced across the target of the range commutator tube K at predetermined distances from the left side or datum point so as to designate seven distinct ranges. Whenever the red filter 83 is cooperatively associated with the screen S, peaks formed only on the electrode 71 are to be used to key the tube 17. Accordingly, all signals received from close objects will form peaks lying completely on the electrode 71, and the tube 17 is keyed by the resulting signal from the amplifier 94' to produce a bright red appearing image at a point on the screen S determined by the instantaneous values of the voltages 45', 45''. Since this point moves over the screen in synchronism with the irradiated spot on the object, the complete image formed on the screen comprises a reproduction of the object, with distances characterized in color as by the disc I. If the peaks 81 are formed on both of two adjoining electrodes, electrodes 71 and 72 for example, the cathode ray stream is operated during the intervals that either the red or the green filters are in cooperative relation to cause a blending of these colors to the observer. If the signal formed by the peak 81 lies preponderantly on the electrode 71 and only to a minor degree on the electrode 72, the image formed will appear orange; if the peak lies substantially equally on both segments, the image will appear more nearly yellow. In a corresponding manner signals received at successively later intervals following the transmission of each pulse will form peaks lying on either or both of the electrodes 72, 73, which signals will cooperate with the filters 84 and 85 to produce either green or blue appearing images. While reference herein is made to colored images, it is to be understood that the colors imparted result from the optical effect of viewing the luminous spots through one or more transparent filters, and that in such case no actual physical coloring of the images on the screen occurs. In any event, the observer sees a colored representation composed of the filtered image on the screen. Stated somewhat differently, a position indication of an object or portion of an object is provided relative to at least one reference axis. If desired, a two dimensional presentation of such an object may be obtained. Such position indications or two dimensional presentations may be color characterized in accordance with the position or distance of said object relative to the radiator R.

Figures 3, 4, 5, 6, 7:
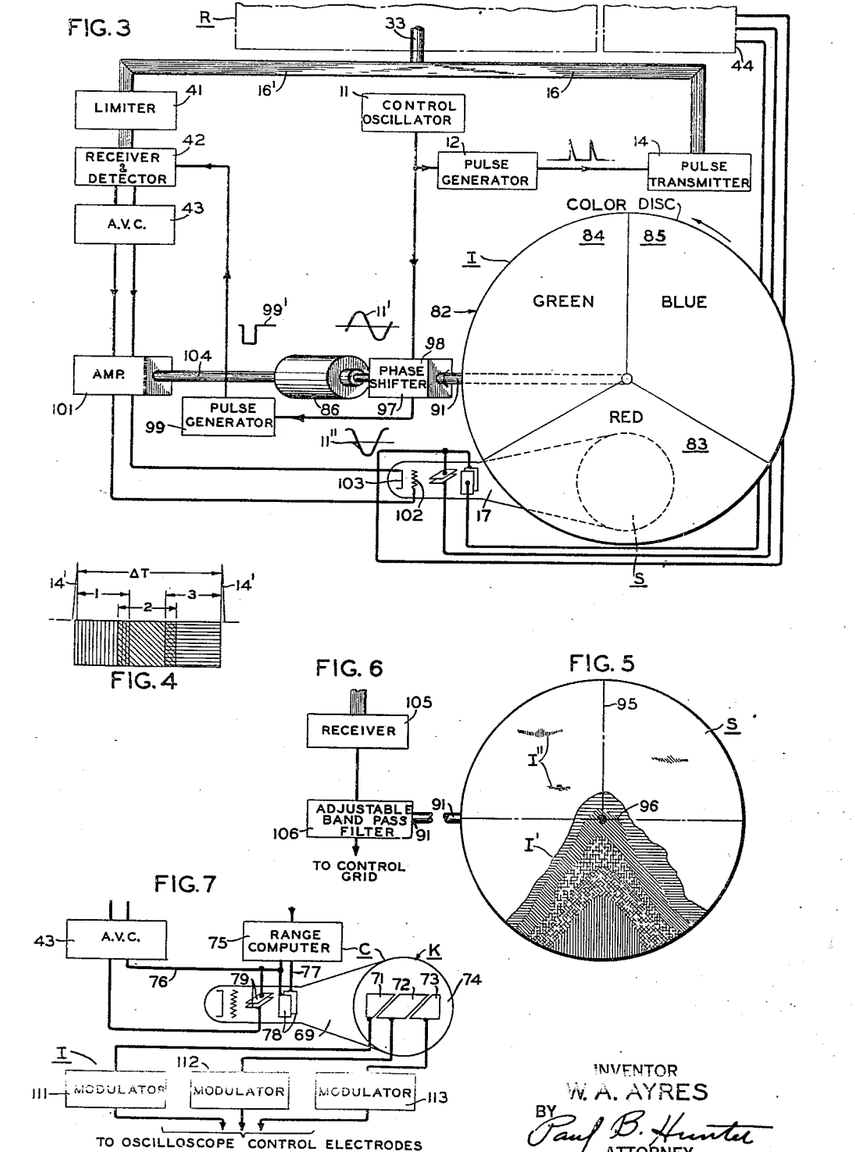
Fig. 3 is a schematic diagram of a modified form of apparatus which may be used in carrying out the invention.
Fig. 4 is a chart illustrating the manner in which the time interval between two successive pulses may be divided to denote different ranges.
Fig. 5 is a typical reproduction, or image, formed of obstacles in the path of an aircraft illustrating the manner in which colors may be used to denote range.
Fig. 6 is a schematic diagram of a portion of the circuit of Fig. 3, showing an adaptation of the system to a frequency-sensitive receiver.
Fig. 7 is a schematic diagram of a portion of the system of Fig. 1, incorporating additional modifications.

The manner in which the respective portions of a cycle between successive transmitted pulses may be divided to denote different ranges is indicated in Fig. 4 wherein successive pulses 14' occur at a time interval $\Delta t$. The time interval may be divided into the three zones marked 1, 2 and 3, which zones may characterize by the colors designated in Fig. 4 images formed during the corresponding periods. As indicated, the end zones may overlap the middle zone by any desired degree so as to form intermediate zones characterized by separate colors, preferably representing a combination of the two adjoining colors.

Fig. 5 discloses a typical reproduction or image I' in color as it appears on the screen S of the tube 17. Cross lines 95 may be formed on the screen S and an index 96 designating an aircraft may be formed at the intersection of the cross lines for aircraft use, to indicate to the pilot the relation of scanned objects to the path of flight. The image I' is intended to represent the mountain peak, the top and side edges of which are located at progressively greater distances from the surveying mechanism or radiator R. To illustrate the adaptability of the invention to military uses, a plurality of aircraft I'' are illustrated in colors designating their range. Although the apparatus as presently disclosed is capable of forming only one group of colored representations at a time, the separately colored representations are formed in such rapid succession that they merge and combine so as to form a complete representation or reproduction, the various portions of which may be represented by different colors.

Fig. 3 discloses a modified version of the present invention capable of forming images of the type shown in Fig. 5 but wherein the electronic range commutator K has been replaced by a range gating mechanism 97. The control oscillator, pulse generator, pulse transmitter, and limiter cooperate with the radiator R and the sweep circuit mechanism 44 in the same manner as do the corresponding parts disclosed in Fig. 1. However, the receiver 42 preferably is biased to cut-off and accordingly is incapable of passing any signals to the automatic volume control 43 until the receiver is biased on. The gating mechanism 97 is useful for this purpose and comprises a phase shifter 98 adapted to shift the phase of the wave 11' shown in Fig. 3, for example, to the form 11''. The waves 11'' are conducted to a pulse generator 99 adapted to produce a substantially square wave 99' capable of biasing the receiver on. Each pulse 99' therefore serves as a gate for the reception of reflected signals received at predetermined periods following the transmission of each pulse, so that the receiver becomes selective to a predetermined range. To properly correlate the received signals with the respective filters 83, 84, and 85, it is necessary only to synchronize the motion of the color disc 82 with that of phase shifter 98 so as to advance and retard the pulses 99'. As shown in Fig. 3 this result is obtained by controlling the gating mechanism 97 with the motor 86 that drives the disc 82. The particular type of phase shifter employed depends upon the use to which the instrument is to be put.

In one case the shifting of phase may be progressive as by manipulating a variable reactance, to provide as many range steps as desired. However, with the simple form of apparatus shown in Fig. 3, the phase shifter may comprise several reactive circuits adjusted so as to form a gating pulse 99' occupying any of the zones 1, 2 and 3 respectively of Fig. 4 acording to the position of shaft 91. The pulses 99' are shown to be substantially of the square type so that the receiver is either in the full on or off condition, but by proper choice of clipping and amplifying circuits in the pulse generator 99 the pulses 99' may be made to produce a signal in the receiver tapering near the extreme positions of the gate so as to provide a more gradual transition between the on and off positions, and consequently to provide quantitative changes in color density. This arrangement provides a greater range of color mixing along the lines obtained with the sloping edges of the electrodes 71, 72 and 73 of Fig. 1. An amplifier 101 amplifies the impulses from the automatic volume control 43, and the amplifier output terminals connect with the control grid 102 and cathode 103 of the tube 17 as shown in Fig. 3. The amplifier 101 may be provided with a gain control operated by a shaft 104 extending from the motor 86 so that the gain for each group of signals may be varied to compensate for the filter transmission factors.

Fig. 6 discloses a typical arrangement adapted to characterize images according to a frequency differential. Thus, an object may be irradiated with continuous wave energy transmitted from a source properly isolated from the receiver. Waves reflected from moving objects have a frequency higher or lower than the incident energy by a differential herein referred to as the Doppler frequency, delivered by receiver 105. Instead of using a phase shifter, as shown in Fig. 3, to control the incoming signals, the reproducing means may utilize an adjustable band-pass filter 106 adapted to pass to the control grid of tube 17, signals of predetermined frequency. By connecting the filter 106 to the shaft 91, the frequency passed may be coordinated with the position of the disc 82, thereby providing representations which are colored according to the Doppler frequency.

In Fig. 7, the image-characterizing means I uses an alternative method for controlling the color, tone, texture or other characteristic of a given image, as a function of, for example, the range. As indicated, use may be made of the range commutator K or other like differentiating mechanism to alter the appearance of the elements making up each image, by feeding the commutator responses to modulators 111, 112 and 113 adapted to characteristically modulate the images formed on the screen S. As an example, the modulators 111, 112 and 113 may comprise low frequency oscillators, each having a particular frequency, which modulators may be keyed from a biased-off condition to an operating condition by the currents flowing from the segments 71, 72, 73. The modulators characterize the respective signals and render the signals visually distinguishable by connecting the output from each modulator with at least one of the control electrodes of the oscilloscope 17. If the modulator output connections extend to the grid of the oscilloscope, the respective modulator frequencies characterize the images formed, by causing intermittent brightening of the trace or stream, and the respective images are produced as a series of dots or pulsations identifying the portions of the images in terms of range or other function. Additionally, or in the alternative, the output connections from the modulators 111, 112, 113 may extend to the respective deflecting plates 67, 68 to cause a characteristic deflection of the trace for each group of range signals, so as to texturally modify the images. Thus, modulated signals from the electrode 71 may be conducted to plates 68, causing sufficient horizontal deflection to alter the texture of the images without effective variation in the shape of the image. Likewise currents from electrodes 72 and 73 may cause vertical and diagonal modulation of the trace by controlling the corresponding deflection plates of the tube 17. If the modulators are thus used solely to cause a characteristic minute deflection of the trace, the respective modulators may have the same frequency or other modulating quality.

It will be observed from the foregoing that by some such modulation arrangement, the color disc may be dispensed with, whereby all of the impulses received from the irradiated object are useful in forming images. Since the characterizing means for all range signals are operative continuously, the arrangement eliminates the inoperative periods during which the improper filter is in the cooperative position, or during which the division line of the disc passes in front of the screen S, and thus provides better definition by utilizing more responses per image. Although the modulators 111, 112 and 113 have been described as oscillators capable of producing a characteristic change in the texture of the images, other modulating equipment may be used to influence the images in order to render them chromatically or otherwise distinctive in appearance.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method of indicating distances to an object from a source, comprising irradiating said object, receiving reflections from said irradiated object, forming a visual representation of said object in accordance with radiant energy reflected from said object and varying the chromatic appearance of said visual representation in accordance with the time required for radiating energy to travel between said object and said source thereby imparting a three-dimensional effect to said visual representation.

2. A method of forming an image of a remote object, comprising projecting electromagnetic energy from a source against successive portions of said object, receiving reflections from said portions, forming an image of said portions in accordance with electromagnetic energy reflected from said portions, and chromatically characterizing the successive portions of said image as a function of the travel time required for said energy to travel between said source and said respective portions of said object.

3. In a method of irradiating distant objects with periodically transmitted radiant energy waves and forming images on an indicating device of said objects in accordance with received waves reflected from said objects, the steps comprising measuring the time interval elapsing between the transmission of each radiant energy wave and the receipt of a reflected wave, and forming differently colored representations of each image in accordance with the extent of said time interval.

4. In a method of electromagnetically irradiating successive portions of an object and forming delineations of said portions of said object on an indicating device in response to electromagnetic energy reflected from said portions, the steps comprising disposing differently colored media successively into cooperative relation with said delineations so as to form colored appearing delineations, and commutating the delineations so that whenever a first colored medium is in cooperative relation only delineations resulting from energy having a relatively short travel time are formed, and so that whenever a second and differently colored medium is in cooperative relation only delineations resulting from energy having a longer travel time are formed.

5. A method as claimed in claim 4 wherein the respective travel times constitute periods, adjoining periods having mutually overlapping portions, whereby delineations formed by responses occurring during said overlapping portions are rendered colored in appearance by each of the corresponding colored media.

6. Apparatus for irradiating a distant object and forming a colored representation thereof, comprising means for transmitting a beam of radiant energy waves, scanning means for projecting said beam against successive portions of said object, means adapted to receive radiant energy waves reflected from said object, oscillographic reproducing means cooperating with said receiving means and controlled by said waves reflected from said object, said reproducing means having a screen with successive portions thereof adapted to be excited by an electron stream in synchronism with the movement of said beam of radiant energy waves, thereby to form on said screen of said reproducing means luminous positional representation of said scanned object portions in accordance with said reflected waves, and coloring means synchronized with said representations only during predetermined intervals following the transmission of successive waves, whereby representations formed on said reproducing screen during said intervals appear colored.

7. Apparatus as claimed in claim 6 wherein said coloring means comprise at least one transparent colored filter intermittently movable into and out of cooperative relation with said screen.

8. Apparatus for irradiating a distant object and forming a colored representation thereof, comprising means for transmitting a beam of radiant energy waves, scanning means for projecting said beam against successive portions of said object, means adapted to receive radiant energy waves reflected from said object, oscillographic reproducing means cooperating with said receiving means and controlled by waves reflected from said object, said reproducing means having an electron-sensitive screen with successive portions thereof adapted to be excited by an electron stream in synchronism with the movement of said beam of radiant energy waves, thereby to form on said screen luminous images of said scanned object portions in accordance with said reflected waves, and a plurality of separately colored coloring means, and means for rendering said coloring means synchronized with said images during separate predetermined periods following the transmission of said waves.

9. Apparatus for irradiating a distant object and forming a colored appearing image thereof, comprising means for transmitting a beam of radiant energy waves, scanning means for projecting said beam against successive portions of said object, means adapted to receive radiant energy waves reflected from said object, oscillographic reproducing means cooperating with said receiving means and controllable by waves reflected from said object, said reproducing means having an electron-sensitive screen with successive portions thereof adapted to be excited by an electron stream in synchronism with the movement of said projected beam scanning said object thereby to form on said screen luminous images of said scanned object portions in accordance with said reflected waves, color filters adapted to pass different colors, means for moving said filters successively into cooperative relation with said screen for a length of time extending over the transmission of a plurality of waves, and means for rendering said reproducing means inoperative to form said images during said length of time except for predetermined short periods following the transmission of each wave, during which periods reflected waves are received designating ranges corresponding to each of said filters.

10. Apparatus for irradiating a distant object and forming a colored appearing image thereof, comprising means for transmitting a beam of radiant energy waves, scanning means for projecting said beam against successive portions of said object, means adapted to receive radiant energy waves reflected from said object, oscillographic reproducing means cooperating with said receiving means having an electron-sensitive screen with successive portions thereof adapted to be excited by an electron stream in synchronism with the movement of said projected beam scanning said object, said oscillographic means being responsive to radiant energy waves reflected from said object thereby to form on said screen an image of the successively scanned portions of said object, commutating means adapted to segregate reflected waves received from said object in accordance with the travel time of said waves, and coloring means cooperable with said commutating means to render said images colored in accordance with said travel time.

11. Apparatus as claimed in claim 10 wherein said color rendering means comprises a plurality of transparent colored filters each of which is recurrently movable into cooperative relation with said screen, and wherein said commutating means is adapted to activate said electron stream between successive transmitted waves only during an interval corresponding to predetermined limits of said travel time which limits designate ranges to be identified by the concurrently cooperating filter.

12. Apparatus for imparting a colored appearance to images of distant objects formed on an electron sensitive viewing screen, said distant objects reflecting electromagnetic energy impinging thereupon from an irradiating source, said apparatus comprising means for receiving said reflected energy, indicating means cooperating with said receiving means for determining the time-interval required for said energy to travel between said irradiated source and said object, said indicating means further comprising an electron gun and an electron sensitive screen whereby said reproduction of said distant objects are formed as a result of said received reflections, coloring means cooperable during intermittent periods with said viewing screen, and control means for inhibiting the formation of all said images during said periods except those reproductions formed in response to electro-magnetic energy having travel time intervals within predetermined limits.

13. Apparatus for imparting a colored appearance to reproductions of distant objects formed on an electron sensitive viewing screen, said distant objects reflecting electromagnetic energy impinging thereupon from an irradiating source, said apparatus comprising means for receiving said reflected energy, indicating means cooperating with said receiving means for illustrating the time-interval required for said energy to travel between said irradiated source and said objects, said indicating means further comprising an electron gun and an electron sensitive screen whereby said reproductions of said distant objects are formed as a result of said reflected energy, coloring means cooperable during intermittent periods with said viewing screen, and control means for inhibiting the formation of all said reproductions during said periods except those of said reproductions formed in response to electromagnetic energy having travel time intervals within predetermined limits, and wherein said coloring means comprises a plurality of successively cooperable color filters, and wherein said control means includes a commutator operative in conjunction with said respective filters.

14. Apparatus for imparting color to images formed on a screen in response to electromagnetic energy pulses transmitted to and reflected from successive portions of an object, said apparatus comprising pulse receiving means, range detecting means adapted to determine the time interval between transmitted and received pulses, indicating means cooperative with said detecting means to form images of said successive portions of said object, said indicating means including an electron gun and an electron sensitive screen, color means adapted to chromatically distinguish between images representing different ranges, said color means including a plurality of color filters successively cooperable with said screen, switching means for rendering said receiving means inoperable except to pulses received during intervals occurring at predetermined times after the transmitted pulses, and control means adapted to retard and advance said intervals according to which of said filters concurrently is in cooperative relation with said screen.

15. In apparatus for imparting color to images formed on a screen in response to electromagnetic energy pulses transmitted upon and reflected from successive portions of an object, said apparatus comprising means receiving said reflected pulses, detecting means, indicating means including a cathode ray tube having a screen, range commutating means including a second cathode ray tube having a target area, a plurality of range detecting electrodes located on said target area at successive distances from a datum point on said target area constituting the normal point of impingement of said cathode ray, sweep means having the frequency of said pulses adapted to sweep said cathode ray periodically from said datum point along a path adjacent to said electrodes, and deflector means responsive to reflected pulses for deflecting said cathode rays from said path onto at least one of said electrodes, thereby to induce a flow of current in said respective electrodes, coloring means having separately colored portions successively cooperable with said screen, and color commutating means actuated in synchronism with said coloring means to render a single one of said electrodes operable to key said second tube while each of said colored portions cooperates with said screen.

16. Object locating apparatus comprising a source of electromagnetic energy, scanning means including a directional antenna connected to said energy source for successively irradiating objects disposed in space, a receiver connected to receive electromagnetic energy reflected from said objects, circuit means controlled from said receiver and responsive differently to received reflected energy depending on the ranges of the objects from said apparatus, means including a cathode ray tube controllable in synchronism with said scanning means and connected to said circuit means for providing indications of the positions of the objects, and chromatic means controllable in synchronism with said circuit means and cooperable with said cathode ray tube for rendering said position indications of said objects colored in accordance with the respective ranges of the objects.

17. Range and position indicating apparatus comprising a directive radiant energy wave radiator operated to irradiate relative to at least one reference plane successive portions of a remote object, means for receiving reflections from the irradiated object, means synchronized with said directive radiator for indicating relative to said reference plane the positions of said successive portions of the remote object, range computing means connected to produce a response proportional to the time interval required for said radiant energy wave to travel between said successive portions of the object and said receiving means, and means cooperating with said range computing means and said indicating means for forming a composite representation in colors respectively denoting the ranges of the successive portions of the object.

18. Position and speed determining apparatus for forming colored indications of an irradiated moving object as a function of the frequency differential characterizing the motion of said object between the incidence and reflection of radiant energy, said apparatus comprising a receiver, means including an oscilloscope operable by said receiver for forming relative to at least one reference axis a position indication of said object, differently colored media synchronizable with said position indication means, and frequency-differential selecting means characterizing the rate of motion of said object regulable in synchronism with said media, whereby said position indication appears characteristically colored in accordance with said rate of motion.

19. In apparatus for successively irradiating portions of space to locate a distant object in accordance with radiant energy waves reflected from said object, means for differentiating between the incident and reflected radiant energy waves, a positional indicator connected to said differentiating means and including a cathode ray tube having a screen for indicating the position of said object relative to a given reference plane, and means including an oscillator connected to said tube for characterizing said positional indication of said object thereupon as a function of range of said object.

20. Object locating apparatus comprising a directive radio antenna rotatable in azimuth and elevation, means for receiving radio waves reflected from an irradiated object, an oscilloscope having an electron sensitive screen adapted to indicate the position of said object in azimuth and elevation, the indications of said oscilloscope being synchronizable with said antenna, and means connected to said oscilloscope for characterizing the position indication of said object as a function of the distance of its object from said antenna, said characterizing means comprising oscillator apparatus adapted to activate the beam of said oscilloscope at frequencies correlated with the distance of said object from said antenna.

21. In object locating apparatus, a directive antenna rotatable in azimuth and elevation for scanning successive portions of space, a receiver connected to said antenna for receiving radiant energy from an irradiated object disposed in space about said apparatus, commutating means connected to said receiver and including a cathode ray tube having a target area including a plurality of detecting electrodes, said tube having electron beam control means for selectively activating at least one of said electrodes as a function of the position in space of said object, thereby to selectively induce a flow of current in said electrode, indicating means connected to and controllable by said receiver for displaying a two-dimensional presentation of said object, and control means connected to said indicating means and responsive to said commutating means for color characterizing said two-dimensional presentation in accordance with the position of said object.

22. In apparatus for locating distance objects, directive antenna means for selectively receiving electromagnetic energy from irradiated objects located in space about said apparatus, a receiver connected to said directional antenna means, means including a cathode ray tube connected to said receiver and having sweep circuits controllable in synchronism with said antenna means for providing two-dimensional position indications of said objects, a circuit control means for segregating in plural selected ranges said received electromagnetic energy in accordance with the progressively larger propagation time intervals of said energy from said objects to said apparatus, and chromatic means synchronizable with said sweep circuits and connected to said circuit control means for rendering the appearance of said position indications colored as a function of said selected ranges.

23. In apparatus for locating objects, a directional antenna movable in azimuth and elevation, a receiver connected to said antenna for receiving electromagnetic energy from said objects, a cathode ray tube having a screen and connected to said receiver, sweep circuits connected to said tube and synchronizable with said antenna, whereby said screen provides bearing indications of said objects in azimuth and elevation, circuit means connected to said receiver for segregating said received electromagnetic energy as a function of the time of propagation of said energy from said object to said receiver, and separate coloring means connected to said circuit means and cooperable with said screen for differently coloring said bearing indications in accordance with range.

24. In apparatus for successively irradiating selected portions of space and forming a positional representation of an object disposed therein, a rotatable antenna, a radio receiver connected to said antenna for receiving radiant waves reflected from an irradiated object, means for segregating said reflected waves in accordance with the propagation time interval of said waves from said object to said antenna, said segregating means including a plurality of positioned electron collecting electrodes, modulator means connected to receive the output of said segregating means, and a cathode ray tube having sweep circuits synchronizable with said rotatable antenna and having a screen for displaying two dimensional positional indications of said object, said modulator means being connected to the control electrodes of said tube to modulate the beam of said oscilloscope at a frequency correlated with the distance of said object, whereby said representation is light intensity modulated providing an indication of the distance of said object from said antenna.

25. Apparatus for forming an image of a remote object, comprising a source of electromagnetic energy, directional antenna means connected to said source for projecting electromagnetic energy against successive portions of said object and receiving electromagnetic energy reflected from said object, circuit means for separating in predetermined ranges said reflected energy according to the travel time of said reflected energy from said object to said directional means, and means for chromatically characterizing the successive portions of said image as a function of said travel time.

WALDEMAR A. AYRES.

REFERENCES CITED

The following references are of record in the file of this patent:

UNITED STATES PATENTS

| Number | Name | Date |
|---|---|---|
| 1,913,148 | Alexanderson | June 6, 1933 |
| 2,075,808 | Fliess | Apr. 6, 1937 |
| 2,109,773 | Harding | Mar. 1, 1938 |
| 2,143,035 | Smith | Jan. 10, 1939 |
| 2,165,308 | Skellett | July 11, 1939 |
| 2,193,361 | Rice | Mar. 12, 1940 |
| 2,227,598 | Lyman et al. | Jan. 7, 1941 |
| 2,231,929 | Lyman | Feb. 18, 1941 |
| 2,294,820 | Wilson | Sept. 1, 1942 |
| 2,408,415 | Donaldson | Oct. 1, 1946 |
| 2,428,351 | Ayres | Oct. 7, 1947 |
| 2,445,213 | Evans | July 13, 1948 |

FOREIGN PATENTS

| Number | Country | Date |
|---|---|---|
| 702,686 | Germany | Feb. 13, 1941 |
| 520,778 | Great Britain | May 3, 1940 |
| 542,634 | Great Britain | Jan. 21, 1942 |